(12) United States Patent
Clemm et al.

(10) Patent No.: US 8,429,610 B2
(45) Date of Patent: Apr. 23, 2013

(54) COMPUTER METHOD AND APPARATUS FOR PROVIDING VERSION-AWARE IMPACT ANALYSIS

(75) Inventors: Geoffrey M. Clemm, Concord, MA (US); Allan R. Tate, Bedford, MA (US)

(73) Assignee: International Business Machines Corporation, Armonk, NY (US)

( * ) Notice: Subject to any disclaimer, the term of this patent is extended or adjusted under 35 U.S.C. 154(b) by 1669 days.

(21) Appl. No.: 11/314,283

(22) Filed: Dec. 20, 2005

(65) Prior Publication Data
US 2007/0143744 A1    Jun. 21, 2007

(51) Int. Cl.
G06F 9/44   (2006.01)
(52) U.S. Cl.
USPC ............................ 717/122; 717/120; 717/121
(58) Field of Classification Search ........... 717/120–134
See application file for complete search history.

(56) References Cited

U.S. PATENT DOCUMENTS

| | | | |
|---|---|---|---|
| 4,853,843 A | 8/1989 | Ecklund | |
| 5,278,979 A * | 1/1994 | Foster et al. | 707/203 |
| 5,574,898 A | 11/1996 | Leblang et al. | |
| 5,649,200 A * | 7/1997 | Leblang et al. | 717/122 |
| 5,701,472 A | 12/1997 | Koerber et al. | |
| 5,898,872 A * | 4/1999 | Richley | 717/121 |
| 6,112,024 A * | 8/2000 | Almond et al. | 717/122 |
| 6,385,768 B1 * | 5/2002 | Ziebell | 717/121 |
| 6,442,754 B1 * | 8/2002 | Curtis | 717/175 |
| 6,536,037 B1 * | 3/2003 | Guheen et al. | 717/151 |
| 6,698,013 B1 | 2/2004 | Bertero et al. | |
| 6,701,514 B1 * | 3/2004 | Haswell et al. | 717/115 |
| 6,934,716 B2 | 8/2005 | Bradley et al. | |
| 7,069,547 B2 | 6/2006 | Glaser | |
| 7,133,874 B2 * | 11/2006 | Hill et al. | 1/1 |
| 7,191,435 B2 * | 3/2007 | Lau et al. | 717/168 |
| 7,409,676 B2 * | 8/2008 | Agarwal et al. | 717/120 |
| 7,480,893 B2 * | 1/2009 | Berenbach et al. | 717/104 |
| 7,490,319 B2 * | 2/2009 | Blackwell et al. | 717/124 |
| 7,735,062 B2 | 6/2010 | de Seabra e Melo et al. | |
| 2003/0084425 A1 | 5/2003 | Glaser | |
| 2003/0120678 A1 * | 6/2003 | Hill et al. | 707/102 |
| 2003/0121024 A1 * | 6/2003 | Hill et al. | 717/107 |
| 2003/0204538 A1 * | 10/2003 | Keene | 707/203 |
| 2004/0268302 A1 * | 12/2004 | Srivastava et al. | 717/108 |
| 2005/0172306 A1 * | 8/2005 | Agarwal et al. | 719/328 |
| 2005/0210445 A1 | 9/2005 | Gough et al. | |
| 2006/0010425 A1 * | 1/2006 | Willadsen et al. | 717/120 |
| 2006/0130040 A1 * | 6/2006 | Subramanian et al. | 717/168 |

OTHER PUBLICATIONS

Conradi, R. and B. Westfechtel, "Version Models for Software Configuration Management," ACM Computing Surveys, vol. 30, No. 2, Jun. 1998 (pp. 232-282).*

(Continued)

*Primary Examiner* — Wei Zhen
*Assistant Examiner* — Matthew Brophy
(74) *Attorney, Agent, or Firm* — Hamilton, Brook, Smith & Reynolds, P.C.

(57) ABSTRACT

A computer implemented method and apparatus for providing dependency traceability in software configuration management. Per configuration of a subject software program formed of one or more artifacts, a version history of each artifact is maintained. For each artifact, coupled to the respective version history of the artifact is an indication of status of traceability relationship for each indicated version. One implementation employs a traceability object to maintain and provide such status indications. The status indications are view independent and enable dependency traceability relationship of each artifact to be determinable in each configuration employing the artifact.

17 Claims, 5 Drawing Sheets

OTHER PUBLICATIONS

Lindvall, M. and Sandahl, K. (1998), Traceability aspects of impact analysis in object-oriented systems. Journal of Software Maintenance: Research and Practice, 10: 37-57 Jan. 1998.*

Chen, Y. et al., "Specification-based Regression Test Selection with Risk Analysis," *Proceedings of the 2002 Conference of the Centre for Advanced Studies on Collaborative Research*, Toronto, Canada (14 pp.).

Hayashi, K. et al., Temporally-threaded Workspace: A Model for Providing Activity-based Perspectives on Document Spaces, *Hypertext 98: Ninth ACM Conference on Hypertext and Hypermedia*, Pittsburgh, PA, Jun. 20-24, 1998 (pp. 87-96).

Estublier, J. et al., "Impact of the Research Community on the Field of Software Configuration Management, Summary of an Impact Project Report," *ACM SIGSOFT, Software Engineering Notes*, vol. 27, No. 5, Sep. 2002 (pp. 31-39).

Conradi, R. and B. Westfechtel, "Version Models for Software Configuration Management," *ACM Computing Surveys*, vol. 30, No. 2, Jun. 1998 (pp. 232-241).

Micallef, J. and G.M. Clemm, "The Asgard system: activity-based configuration management" in *Software Configuration Management, ICSE 96 SCM-6 Workshop*, Berlin, Germany, Mar. 25-26, 1996, Selected Papers, pp. 175-186.

Cohen, E.S. et al., "Version management in Gypsy," *SIGSOFT Software Engineering Notes*, vol. 13, No. 5, Nov. 1998 (pp. 201-215).

\* cited by examiner

COMPUTER METHOD AND APPARATUS FOR PROVIDING VERSION-AWARE IMPACT ANALYSIS

BACKGROUND OF THE INVENTION

Software development is typically performed as group projects. A subject software system is developed through design efforts, test efforts, implementation efforts and maintenance efforts. There may be different groups and different group members participating in each of these efforts. Throughout these efforts and among the work group members, various modeling and other development tools are used for increased communication and consistency in developing the subject software system. A software configuration management system is one such tool.

Software configuration management systems provide an interface for users (software developer/engineer) to work with artifacts of a subject software system. An "artifact" is the persistent result of work done by a user, typically persisted in a file system such as a model and source code.

When a software development artifact is modified, the developer would like to know what other artifacts need to be modified in order for the subject system to remain consistent. Being able to perform impact analysis before changing an artifact has been a longstanding (but elusive) need in software development for years. One of the main issues is managing change to software/system requirements. Without the ability to perform impact analysis, artifacts produced as part of the development process drift apart and become inconsistent. This leads to misunderstandings, wasted time, schedule slips and non-conformance to requirements. In short, failure to manage change leads to higher development costs.

For example, when two software artifacts are connected by a dependency traceability relationship, a change to the first artifact might require a change to the second artifact in order to maintain the semantics of that relationship. These dependency traceability relationships are an essential mechanism for determining impact analysis, i.e., determining what other artifacts need to be updated following a change to a given set of artifacts. When the artifacts are placed under version control, many different configurations of those artifact versions are maintained, and changes occur in parallel in a variety of those configurations. When changes from one configuration are merged into another configuration, it appears that all of the dependency traceability relationships to the updated artifacts are suspect, i.e., have to be inspected to see if changes are required, even if the originator of those changes has verified that in fact all of these traceability relationships are valid.

Traditional solutions attempt to solve the problem using manually created and maintained traceability links. Links are manual because the variety of artifact types spans domains: for example, requirements are human readable while code is written in a formal technical language. Complex software systems have hundreds, if not thousands of requirements, and there are many to many relationships between artifact types: requirements, needs, designs, tests, code, etc.

Past attempts to maintain the validity of the traceability relationships fail because the cost to the development team outweighs the benefit. Maintaining the validity of traceability links is an arduous task even for a relatively small development effort and this is one of the main reasons existing traceability solutions fail. There are many accounts that document this issue and the difficulty in solving it.

SUMMARY OF THE INVENTION

The present invention addresses the problems of the prior art and provides improved dependency traceability that enables version-aware impact analysis in software configuration management. There is a relatively reduced effort to maintain traceability links in embodiments of the present invention.

In a preferred embodiment, a computer implemented method and apparatus provide dependency traceability in a software configuration management system by:

for a given configuration of a subject software program formed of one or more artifacts, determining respective version of each artifact;

maintaining a version history of each artifact;

for each artifact, including in the respective version history of the artifact (1) an indication of the determined version, and (2) status indication of traceability relationship for the determined version such that dependency traceability relationship of each artifact is determinable in each configuration employing the artifact.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
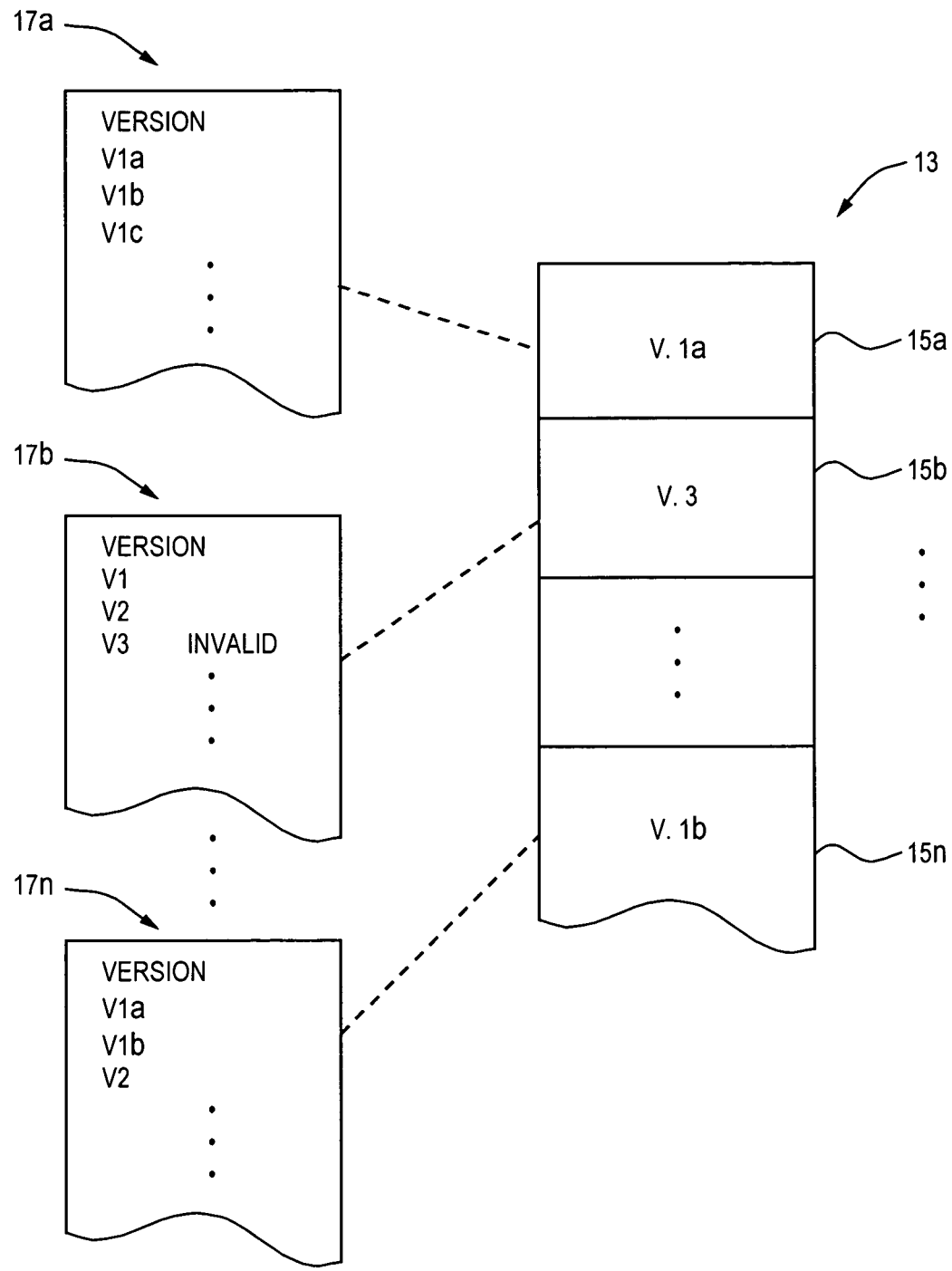
FIGS. 1a-1b are schematic views of a preferred embodiment of the present invention.

Illustrated in FIG. 1a is a configuration management system 11. Configuration management system 11 provides a workspace view of a subject software program 13 various information regarding the object software program 13. The software program 13 is formed of one or more artifacts 15. Each artifact 15 has a respective version forming the subject software program 13. Information regarding the versions of an artifact 15 is stored in a respective version history table or log 17 of the artifact 15. FIG. 1a illustrates one configuration of subject software program 13 although configuration management system 11 stores the foregoing information for each configuration of program 13.

For each configuration, the present invention provides traceability relationship information between pairs of artifacts 15 and specifically between particular versions of artifacts 15 as follows and illustrated in FIG. 1b. Between the version history table 17a of artifact 15a and the version history table 17b of artifact 15b, the present invention provides a respective traceability object 10a. Similarly the present invention provides a respective traceability object 10b between version history table 17b of artifact 15b and version history table 17c of artifact 15c. And so on for traceability objects 10c . . . 10n such that there is a respective traceability object 10 for each pair of version history tables 17 of respective artifacts 15.

Each traceability object 10 stores a respective table 12 indicating the valid pairs of versions of the respective artifacts 15 (that is, the pairs of versions for which the dependency traceability relationship is valid). In the illustrated example, the traceability object 10a (effectively between artifacts 15a and 15b) indicates that the dependency traceability relationship between version V1a of artifact 15a and version V1 of artifact 15b is valid. Likewise traceability object 10a indicates the dependency traceability relationship between version V1b of artifact 15a and version V2 of artifact 15b is valid. Similarly traceability object 10b indicates (in its table 12b) that the dependency traceability relationship between version V1 of artifact 15b and version V1 of artifact 15c is valid, and so forth.

In other embodiments, tables 12 list both valid and invalid pairs of versions of respective artifacts 15. A data column specifies 'valid' or 'invalid' accordingly per table entry.

In the foregoing ways, the present invention stores an indication of status of a dependency traceability relationship in a view-independent fashion. As a result, any information created in one configuration as to the validity of a dependency traceability relation is immediately available (through traceability objects 10 and in particular status indications in entries of tables 12) in any other configuration for which that information is relevant and valid.

Figure 2:
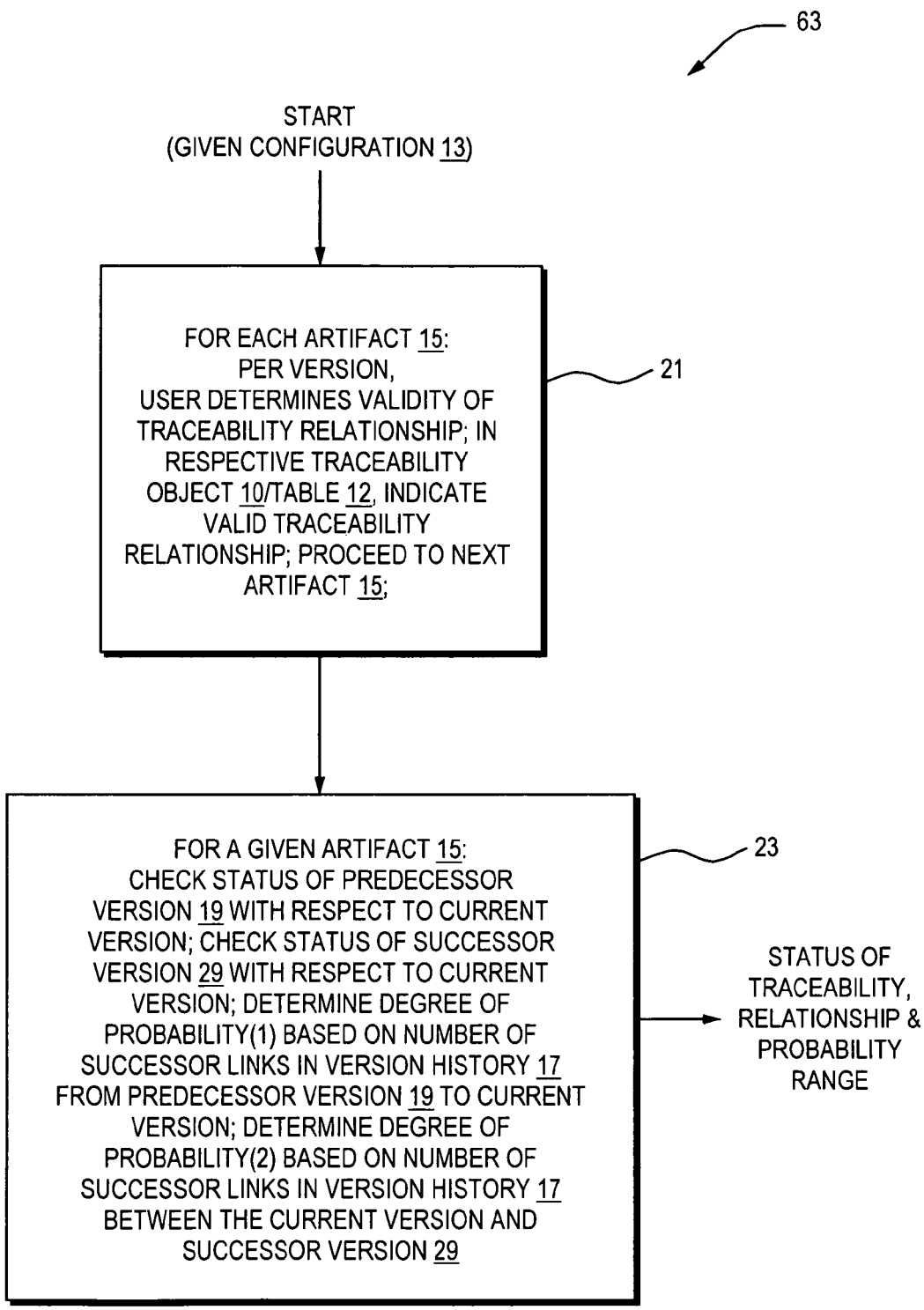
FIG. 2 is a flow diagram of a preferred embodiment.

With reference to a preferred embodiment of FIG. 2, a user interacts with a subject software program 13 (FIG. 1a) in the workspace of a configuration management system 11. For example, say the user acts on artifact 15a. In response, through configuration management system 11, it is given that artifact 15a is traceable to artifact 15b (see for example U.S. patent application Ser. No. 11/303,632, filed on Dec. 15, 2005, entitled "Activity-Based Software Traceability Management Method and Apparatus," incorporated herein by reference). The user then needs to determine if the particular versions (V1a of artifact 15a and V3 of artifact 15b) that he is seeing in the workspace hold a valid traceability relationship. If the user determines the traceability relationship between version V1a of artifact 15a and version V3 of artifact 15b to be valid, then processor routine 63 (at step 21) marks the same (i.e., stores a respective table entry) in table 12a of traceability object 10a corresponding to subject artifacts 15a and 15b.

In other embodiments, if the user determines the traceability relationship to be invalid, then processor routine 63 marks the table 12a entry accordingly (i.e., indicating that the traceability relationship between version V1a of artifact 15a and version V3 of artifact 15b is "invalid").

The user proceeds similarly for each pair of artifacts 15 (according to respective version) in the subject software program 13. See step 21 in FIG. 2. The processor routine 63 responsively annotates tables 12 with the traceability relationships indicated by appropriate entries for the versions of the artifacts 15 in the subject software program 13 configuration. The respective valid/invalid status of each indicated relationship then holds in any other configuration that employs one or more of the artifacts 15. As such the user or other users can easily verify validity of traceability relationships per version of artifacts 15 by accessing/referring to tables 12.

In addition, (step 23) a heuristic is applied based on the tables 12 of traceability objects 10. In particular, if there are no table 12 entries (status indications) for the exact versions of two artifacts 15 selected in a configuration, if there are entries 19, 29 in respective traceability object 10 table 12 for both predecessor and successor versions of an artifact 15, the status indication of those entries 19, 29 is given a degree of probability (based on the number of successor links separating the selected versions from the versions identified by the entry 19, 29). A user can then obtain a "probability range" or confidence rating, i.e., the probability above which the valid/invalid information is to be believed.

Figure 1B:
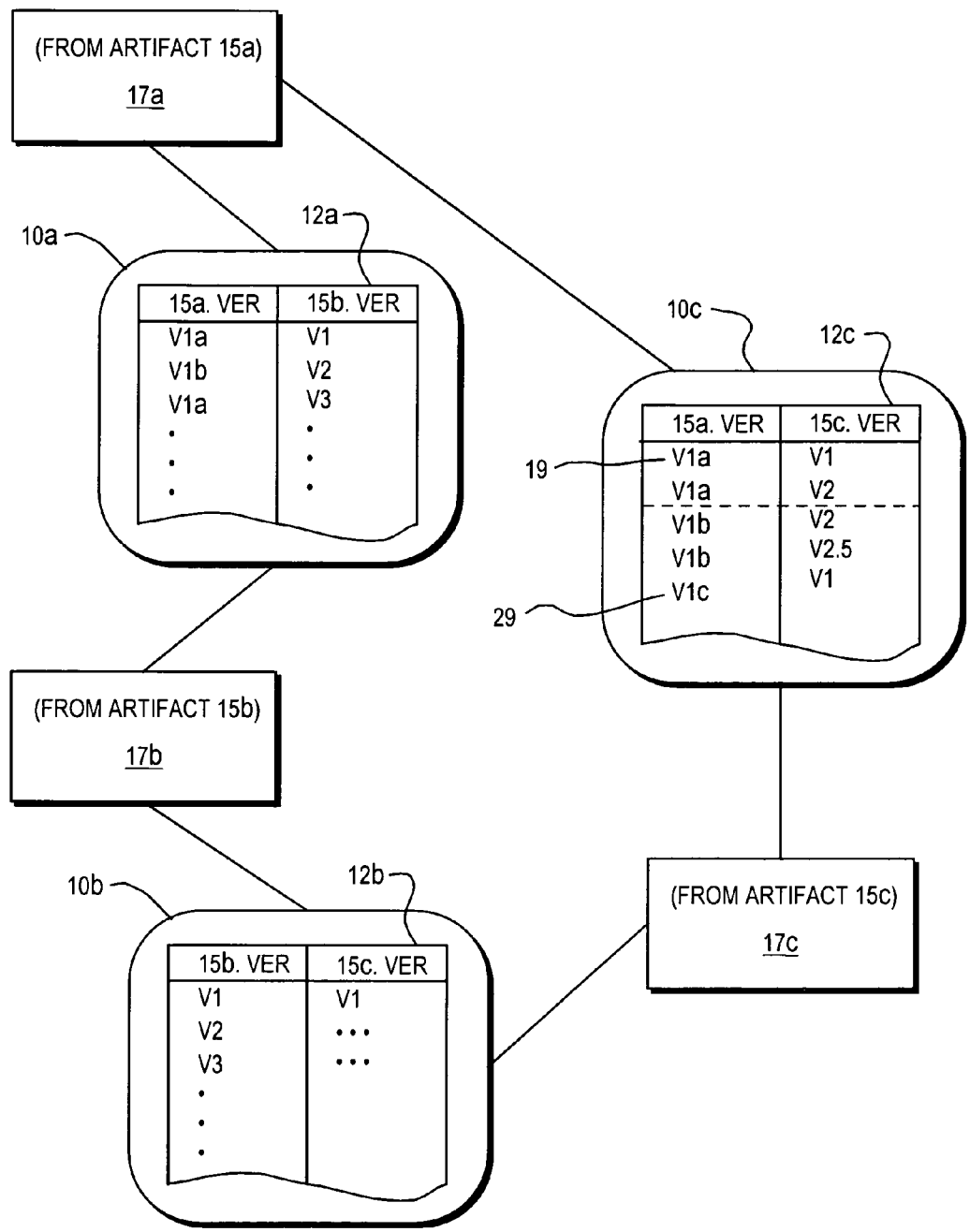

In the illustrated example of FIG. 1b, say that the current versions of interest are version V1b of artifact 15a and version V1 of artifact 15c. A user looking at respective traceability object 10c table 12c finds no entry corresponding to these versions of interest. However, entry 19 in table 12c indicates predecessor version V1a of artifact 15a has a valid traceability relationship with version of interest V1 of artifact 15c. Also table 12c has an entry 29 indicating successor version V1c of artifact 15a has a valid traceability relationship with version of interest V1 of artifact 15c. Step 23 of processor routine 63 looks to version history 17a of artifact 15a and determines the number of links separating predecessor version V1a of entry 19 from version of interest V1b (of artifact 15a). In this example, one such link is determined, and one end of the probability range is defined based on this determination. Step 23 also, from version history 17a, determines the number of links separating successor version V1c of entry 29 from version of interest V1b (of artifact 15a). In this example, one such link is determined and is used to define the other end of the probability range. The resulting probability range indicates a high likelihood that the versions of interest (V1b of artifact 15a and V1 of artifact 15c) have a valid traceability relationship.

Figure 3:
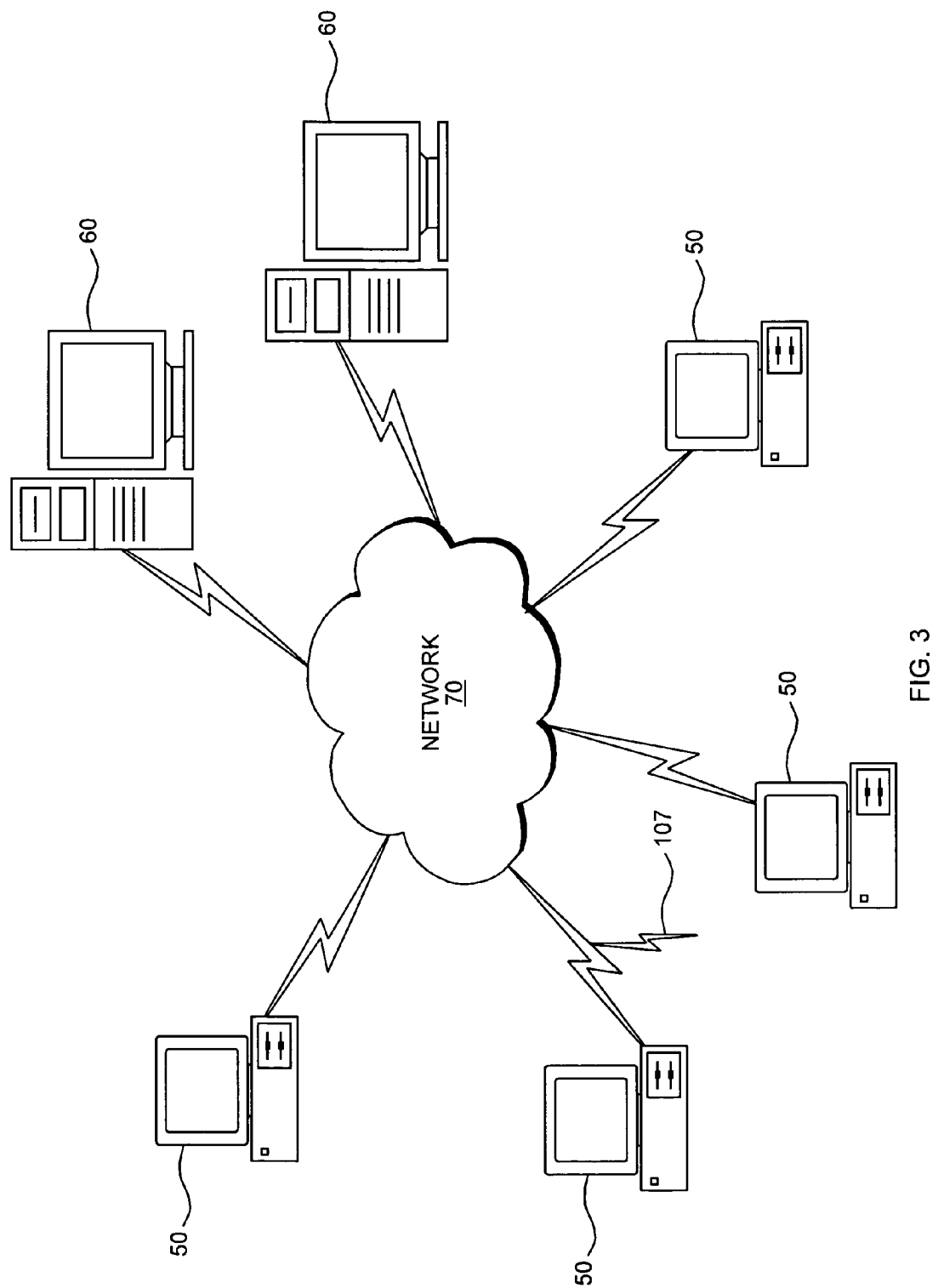
FIG. 3 is a schematic view of a computer network environment in which embodiments of the present invention may be employed.

Accordingly, dependency traceability relationship information is stored and maintained independent of view in the configuration management system 11. As such, embodiments of the present invention reduce the effort required to maintain traceability links. FIG. 3 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 4:
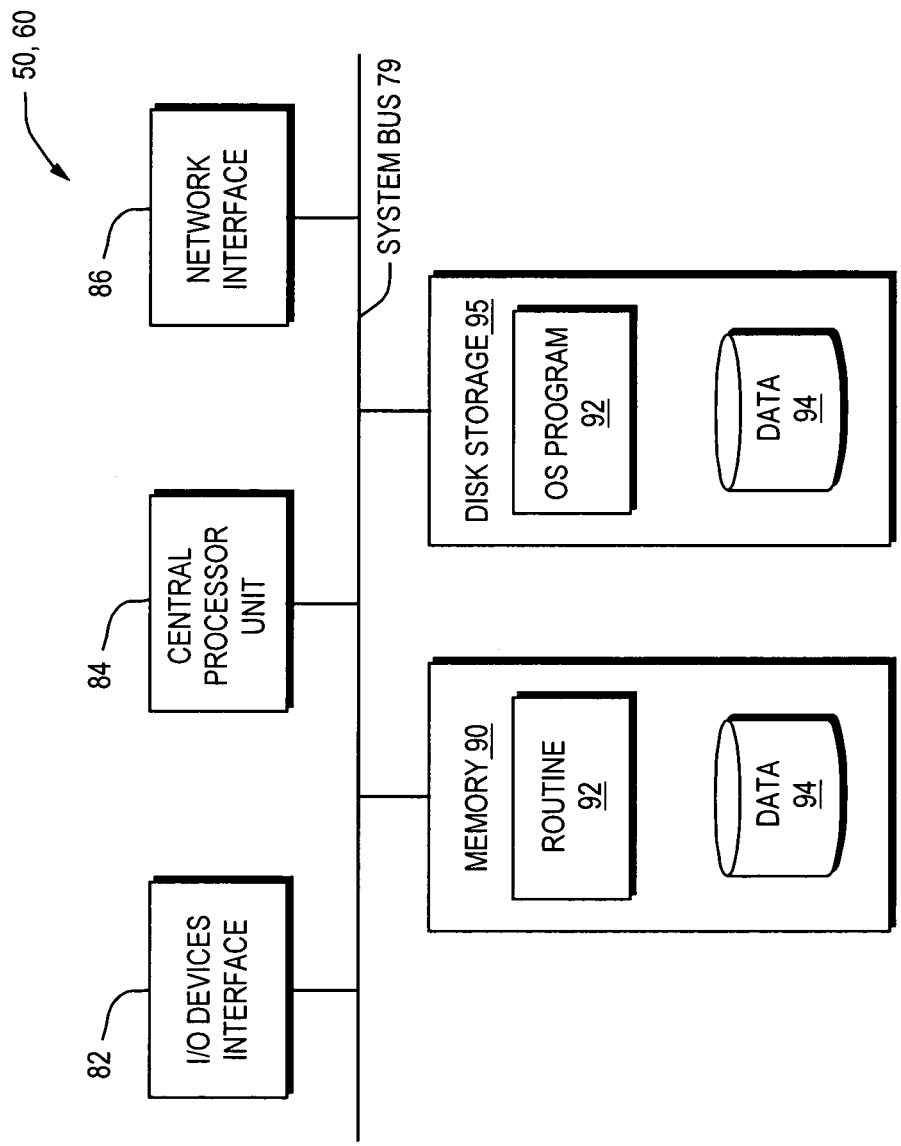
FIG. 4 is a block diagram of a computer node in the network of FIG. 3.

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., annotated indicator tables 12, traceability objects 10 and processor routine code 63 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include, a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to preferred embodiments thereof, it will be understood by those skilled in the art that various changes in form and details may be made therein without departing from the scope of the invention encompassed by the appended claims.

For example, any computer architecture and/or network configuration is suitable for executing embodiments of the present invention. The computer network of FIGS. 3 and 4 is for purposes of illustration and not intended to limit the principles of the present invention.

Version history 17 for each respective artifact 15 may be implemented as a table, a list or other log-like technique that allows appending of entries.

What is claimed is:

1. A computer implemented method for providing dependency traceability in software configuration management, comprising the steps of:
   using a computer, for a given configuration of a subject software program formed of one or more artifacts, determining respective version of each artifact;
   maintaining a version history of each artifact in a storage medium;
   in configuration management, for each pair of artifacts throughout the given configuration, providing a respective traceability object, different pairs of artifacts having different traceability objects, for a given pair of artifacts, the respective traceability object storing a table of status indications between the respective version histories of the artifacts in the given pair, each said status indication in the table indicating a respective pair of versions of said artifacts for which a dependency traceability relationship is valid or invalid; and
   per version of a given artifact, accessing the traceability objects and determining, from the object tables a probability range for dependency traceability relationship between the version of the given artifact and a first version of a second given artifact based on the number of predecessor or successor links between the version of the given artifact and a second version of the given artifact having a valid traceability relationship with a version of the second artifact based on the status indications of respective versions of the artifacts,
   such that during configuration management the dependency traceability relationship of each pair of artifacts is determinable in each configuration employing one of the artifacts, wherein the probability range is a confidence rating giving a probability above which the status indications indicating a valid or invalid traceability relationship is to be believed.

2. A method as claimed in claim 1 wherein the status indication includes an indication of valid for valid traceability relationships.

3. A method as claimed in claim 1 wherein the status indication is view-independent.

4. A method as claimed in claim 1 wherein the version history is any of a log, table or list.

5. A method as claimed in claim 1 wherein the step of determining a
    probability range includes determining degree of probability based on (a) number of successor links between a predecessor version and the determined version, and on (b) number of successor links between the determined version and a successor version.

6. Computer apparatus for providing dependency traceability in a software configuration management system, the computer apparatus including a storage
    medium, comprising:
    a respective version history for each artifact stored in the storage medium,
    a source of artifacts persisted in memory, different sets of artifacts forming different software programs, and for a given software program formed of a set of artifacts, different versions of the artifacts being employed in different configurations of the given software program, per configuration, the version history of a respective artifact having indications of versions of the artifact;
    in configuration management, for each pair of artifacts in a subject configuration of the given software program, a respective traceability object coupled between respective version histories of the artifacts in the pair, different pairs of artifacts having different traceability objects, for each pair of artifacts the respective traceability object storing a table of status indications of traceability relationships for certain different versions of the artifacts in the pair, each said status indication in the table indicating a respective pair of versions of said artifacts for which a dependency traceability relationship is valid or invalid; and
    a processor routine executed by a processor and per version of a given artifact, accessing the traceability objects and determining, from the object tables a probability range for dependency traceability relationship between the version of the given artifact and a first version of a second given artifact based on the number of predecessor or successor links between the version of the given artifact and a second version of the given artifact having a valid traceability relationship with a version of the second artifact based on the status indications of respective versions of the artifacts,
    such that during configuration management the dependency traceability relationship of each artifact is determinable in each configuration employing the artifact, wherein the probability range is a confidence rating giving a probability above which the status indications indicating a valid or invalid traceability relationship is to be believed.

7. Apparatus as claimed in claim 6 wherein the status indication includes an indication of valid for valid traceability relationships.

8. Apparatus as claimed in claim 6 wherein the status indication is view-independent.

9. Apparatus as claimed in claim 6 wherein the version history is any of a log, table or list.

10. Apparatus as claimed in claim 6 wherein the processor routine determines a probability range by determining a degree of probability based on (a) number of successor links between a predecessor version and the determined version, and
    on (b) number of successor links between the determined version and a successor version.

11. A software configuration management system comprising:
    version history means for providing a respective version history for each artifact, different sets of artifacts forming different software programs, and for a given software program formed of a set of artifacts, different versions of the artifacts being employed in different configurations of the given software program,
    wherein the version history means, per configuration, provides the version history of a respective artifact including an indication of version of the artifact;
    traceability object means providing in configuration management, for each pair of artifacts in a subject configuration of the given software program, a respective table of status indications of traceability relationships for different versions of the artifacts in the pair, each said status indication in the table indicating a respective pair of versions of said artifacts for which a dependency traceability relationship is valid or invalid; and
    processor means executed for maintaining status indications per version in the traceability object means, and, per version of a given artifact, accessing the traceability objects and determining, from the object tables a probability range for dependency traceability relationship between the version of the given artifact and a first version of a second given artifact based on the number of predecessor or successor links between the version of the given artifact and a second version of the given artifact having a valid traceability relationship with a version of the second artifact based on the status indications of respective versions of the artifacts, such that during configuration management the dependency traceability relationship of each artifact is determinable in each configuration employing the artifact, wherein the probability range is a confidence rating giving a probability above which the. status indications indicating a valid or invalid traceability relationship is to be believed.

12. A system as claimed in claim 11 wherein the status indication includes an indication of valid for valid traceability relationships.

13. A system as claimed in claim 11 wherein the status indication is view-independent.

14. A system as claimed in claim 11 wherein the version history is any of a log, table or list.

15. A system as claimed in claim 11 wherein the processor means determines a probability range by determining a degree of probability based on (a) number of successor links between a predecessor version and the determined version, and on (b) number of successor links between the determined version and a successor version.

16. A computer program product comprising:
    a computer readable storage medium including a computer readable program, wherein the computer readable program when executed on a computer causes the computer to:

for a given configuration of a subject software program formed of one or more artifacts, determine respective version of each artifact; maintain a version history of each artifact;

for each pair of artifacts throughout the given configuration, provide in configuration management a respective traceability object, different pairs of artifacts having different traceability objects, for a given pair of artifacts the respective traceability object storing a table of status indications between the respective version histories of the artifacts in the pair, each said status indication in the table indicating a respective pair of versions of said artifacts for which a dependency traceability relationship is valid or invalid; and per version of a given artifact, accessing the traceability objects and determining, from the object tables a probability range for dependency traceability relationship between the version of the given artifact and a first version of a second given artifact based on the number of predecessor or successor links between the version of the given artifact and a second version of the given artifact having a valid traceability relationship with a version of the second artifact based on the status indications of respective versions of the artifacts, such that during configuration management the dependency traceability relationship of each pair of artifacts is determinable in each configuration employing one of the artifacts, wherein the probability range is a confidence rating giving a probability above which the status indication indicates a valid or invalid traceability relationship to be believed.

17. A computer program product as claimed in claim 16 wherein the status indication is view-independent.

* * * * *